United States Patent [19]

Kotzin et al.

[11] Patent Number: 5,073,909

[45] Date of Patent: Dec. 17, 1991

[54] METHOD OF SIMULATING THE STATE OF A LINEAR FEEDBACK SHIFT REGISTER

[75] Inventors: Michael D. Kotzin, Buffalo Grove; Alan L. Wilson, Hoffman Estates, both of Ill.

[73] Assignee: Motorola Inc., Schaumburg, Ill.

[21] Appl. No.: 554,510

[22] Filed: Jul. 19, 1990

[51] Int. Cl.$^5$ .............................................. G11C 5/06
[52] U.S. Cl. ....................................... 377/72; 377/73
[58] Field of Search ...................................... 377/72, 73

[56] References Cited

U.S. PATENT DOCUMENTS

| | | | |
|---|---|---|---|
| 3,439,279 | 4/1969 | Guanella | 377/72 |
| 3,818,242 | 6/1974 | Freedman | 377/72 |
| 4,531,022 | 7/1985 | Pioli | 377/72 |
| 4,780,627 | 10/1988 | Illman | 377/72 |

Primary Examiner—John S. Heyman
Attorney, Agent, or Firm—Val Jean F. Hillman

[57] ABSTRACT

The present invention discloses a method of simulating the state of a TYPE I Linear Feedback Shift Register (LFSR) with information available as a result of a TYPE II LFSR implementation. This is accomplished by clocking a TYPE II LFSR to produce an output sequence. This sequence, or at least a portion thereof, is then stored in a storage medium, such as, for example, a shift register. Cascading a TYPE II LFSR output sequence into a shift register of length N, where N is the number of stages employed by the TYPE II LFSR, is the exact equivalent of a TYPE I LFSR. Accordingly, the shift register's contents will contain data corresponding to the state of a TYPE I LFSR.

14 Claims, 4 Drawing Sheets

TABLE 1

| CLOCK CYCLE | LFSR STATE 11 12 13 14 |
|---|---|
| 0 | 1 0 0 0 |
| 1 | 0 1 0 0 |
| 2 | 0 0 1 0 |
| 3 | 1 0 0 1 |
| 4 | 1 1 0 0 |
| 5 | 0 1 1 0 |
| 6 | 1 0 1 1 |
| 7 | 0 1 0 1 |
| 8 | 1 0 1 0 |
| 9 | 1 1 0 1 |
| 10 | 1 1 1 0 |
| 11 | 1 1 1 1 |
| 12 | 0 1 1 1 |
| 13 | 0 0 1 1 |
| 14 | 0 0 0 1 |
| 15 | 1 0 0 0 |
| 30 | 1 0 0 0 |
| 45 | 1 0 0 0 |

TABLE 2

| CLOCK CYCLE | LFSR STATE 21 22 23 24 |
|---|---|
| 0 | 1 1 0 0 |
| 1 | 0 1 1 0 |
| 2 | 0 0 1 1 |
| 3 | 1 1 0 1 |
| 4 | 1 0 1 0 |
| 5 | 0 1 0 1 |
| 6 | 1 1 1 0 |
| 7 | 0 1 1 1 |
| 8 | 1 1 1 1 |
| 9 | 1 0 1 1 |
| 10 | 1 0 0 1 |
| 11 | 1 0 0 0 |
| 12 | 0 1 0 0 |
| 13 | 0 0 1 0 |
| 14 | 0 0 0 1 |
| 15 | 1 1 0 0 |
| 30 | 1 1 0 0 |
| 45 | 1 1 0 0 |

| TABLE 3 | | |
|---|---|---|
| CLOCK CYCLE | TRANSMIT LFSR 31 32 33 34 | RECEIVE LSFR 35 36 37 38 |
| 0 | 1 0 0 0 | X X X X |
| 1 | 0 1 0 0 | 0 X X X |
| 2 | 0 0 1 0 | 0 0 X X |
| 3 | 1 0 0 1 | 0 0 0 X |
| 4 | 1 1 0 0 | 1 0 0 0 |
| 5 | 0 1 1 0 | 0 1 0 0 |
| 6 | 1 0 1 1 | 0 0 1 0 |
| 7 | 0 1 0 1 | 1 0 0 1 |
| 8 | 1 0 1 0 | 1 1 0 0 |
| 9 | 1 1 0 1 | 0 1 1 0 |
| 10 | 1 1 1 0 | 1 0 1 1 |
| 11 | 1 1 1 1 | 0 1 0 1 |
| 12 | 0 1 1 1 | 1 0 1 0 |
| 13 | 0 0 1 1 | 1 1 0 1 |
| 14 | 0 0 0 1 | 1 1 1 0 |
| 15 | 1 0 0 0 | 1 1 1 1 |

| TABLE 4 | | |
|---|---|---|
| CLOCK CYCLE | TRANSMIT LFSR 41 42 43 44 | RECEIVE LSFR 45 46 47 48 |
| 0 | 1 1 0 0 | X X X X |
| 1 | 0 1 1 0 | 0 X X X |
| 2 | 0 0 1 1 | 0 0 X X |
| 3 | 1 1 0 1 | 1 1 0 X |
| 4 | 1 0 1 0 | 1 0 1 0 |
| 5 | 0 1 0 1 | 0 1 0 1 |
| 6 | 1 1 1 0 | 1 1 1 0 |
| 7 | 0 1 1 1 | 0 1 1 1 |
| 8 | 1 1 1 1 | 1 1 1 1 |
| 9 | 1 0 1 1 | 1 0 1 1 |
| 10 | 1 0 0 1 | 1 0 0 1 |
| 11 | 1 0 0 0 | 1 0 0 0 |
| 12 | 0 1 0 0 | 0 1 0 0 |
| 13 | 0 0 1 0 | 0 0 1 0 |
| 14 | 0 0 0 1 | 0 0 0 1 |
| 15 | 1 1 0 0 | 1 1 0 0 |

TABLE 5

| CLOCK CYCLE | LFSR 500<br>55 56 57 58 | WORKING REGISTER<br>51 52 53 54 |
|---|---|---|
| 0  | 1 1 0 0 | X X X X |
| 1  | 0 1 1 0 | 0 X X X |
| 2  | 0 0 1 1 | 0 0 X X |
| 3  | 1 1 0 1 | 1 0 0 X |
| 4  | 1 0 1 0 | 1 1 0 0 |
| 5  | 0 1 0 1 | 0 1 1 0 |
| 6  | 1 1 1 0 | 1 0 1 1 |
| 7  | 0 1 1 1 | 0 1 0 1 |
| 8  | 1 1 1 1 | 1 0 1 0 |
| 9  | 1 0 1 1 | 1 1 0 1 |
| 10 | 1 0 0 1 | 1 1 1 0 |
| 11 | 1 0 0 0 | 1 1 1 1 |
| 12 | 0 1 0 0 | 0 1 1 1 |
| 13 | 0 0 1 0 | 0 0 1 1 |
| 14 | 0 0 0 1 | 0 0 0 1 |
| 15 | 1 1 0 0 | 1 0 0 0 |
| 30 | 1 1 0 0 | 1 0 0 0 |

TABLE 6

| CLOCK CYCLE | TRANSMIT LFSR 11 12 13 14 | RECEIVE LSFR 55 56 57 58 | WORKING REGISTER 51 52 53 54 |
|---|---|---|---|
| S 0 | 1 0 0 0 | X X X X | X X X X |
| Y 1 | 0 1 0 0 | 0 X X X | 0 X X X |
| N 2 | 0 0 1 0 | 0 0 X X | 0 0 X X |
| C 3 | 1 0 0 1 | 0 0 0 X | 0 0 0 X |
| 4 | 1 1 0 0 | 1 1 0 0 | 1 0 0 0 |
| A · | · | 0 1 1 0 | 0 1 0 0 |
| D J · | · | 0 0 1 1 | 0 0 1 0 |
| U S · | · | 1 1 0 1 | 1 0 0 1 |
| T · | · | 1 0 1 0 | 1 1 0 0 |
| 5 | 0 1 1 0 | 0 1 0 1 | 0 1 1 0 |
| 6 | 1 0 1 1 | 1 1 1 0 | 1 0 1 1 |
| 7 | 0 1 0 1 | 0 1 1 1 | 0 1 0 1 |
| 8 | 1 0 1 0 | 1 1 1 1 | 1 0 1 0 |
| 9 | 1 1 0 1 | 1 0 1 1 | 1 1 0 1 |
| 10 | 1 1 1 0 | 1 0 0 1 | 1 1 1 0 |
| 11 | 1 1 1 1 | 1 0 0 0 | 1 1 1 1 |
| 12 | 0 1 1 1 | 0 1 0 0 | 0 1 1 1 |
| 13 | 0 0 1 1 | 0 0 1 0 | 0 0 1 1 |
| 14 | 0 0 0 1 | 0 0 0 1 | 0 0 0 1 |
| 15 | 1 0 0 0 | 1 1 0 0 | 1 0 0 0 |

METHOD OF SIMULATING THE STATE OF A LINEAR FEEDBACK SHIFT REGISTER

TECHNICAL FIELD

The present invention relates to shift registers, and particularly to linear feedback shift registers (LFSR). Specifically, however, the present invention pertains to a method of simulating the state of a LFSR.

BACKGROUND OF THE INVENTION

LFSRs are well known in the art. Typically, these devices are utilized in operations where the generation of a pseudonoise/pseudorandom (PN) code sequence is required A PN code sequence is a binary signal which appears to be random. In reality, a PN code sequence is not random at all; it is a deterministic, periodic signal whose periodicity is dependent upon the number of stages within the LFSR, the feedback taps, and the LFSR's initial conditions. Typical operations employing LFSR's as PN code sequence generators are: spread spectrum systems, noise generators, and cryptographic systems.

FIG. 1 depicts a simplistic representation of an LFSR 100. Mathematically, the LFSR defines an Nth degree polynomial (where N is the length of the LFSR) with one coefficient for each "tap" (output bit) used to form the feedback signal Accordingly, the LFSR 100 is definable as a fourth degree polynomial, comprising the four stages 11-14, with feedback signal $T1$, obtained from the exclusive-or gate 15 acting upon the output of stages 13 and 14. $T1$ is then fed back to the input of stage 11. It will be appreciated by those skilled in the art that the LFSR 100 is a simplistic model of a PN code sequence generator, selected primarily to show that an LFSR of the Nth degree is ultimately periodic in $2^n - 1$ bits (see Table 1).

It will also be appreciated that the LFSR 100 represents a TYPE I LFSR. Type I, as used herein, defines an LFSR wherein the various flip flops or stages are cascaded together, input to output, without interruption by an intervening feedback signal. This configuration, which is typically based upon a hardware model, facilitates a simple determination of the LFSR's state. Accordingly, the four bits of information found in stages 11-14 of the LFSR 100 are readily available.

This noted characteristic of the TYPE I LFSR, represents a decided advantage over alternative LFSR implementations which provide an identical output sequence. In many instances, the ability to simply replicate a TYPE I LFSR PN sequence is insufficient. Often, it is extremely important to know the state of a specific TYPE I LFSR stage, in conjunction with the PN output sequence. This data is often used in the performance of error-correction routines, phase continuity detection checks, and other control functions vital to overall system operation. TYPE I LFSRs enjoy this capability and therefore are still heavily used in computers and digital processing systems.

Referring now to FIG. 2, FIG.2 depicts the LFSR 100 of FIG. 1 in its alternative configuration. The LFSR 200 of FIG. 2 is a TYPE II LFSR. TYPE II, as used herein, defines an LFSR wherein the various stages are cascaded together, however, the shift path is interrupted by the introduction of a feedback signal.

The LFSR 200 consists of four stages 21-24, an exclusive-or gate 25, and a feedback signal $T2$. According to this implementation, the exclusive-or gate 25 performs an exclusive-or operation on the outputs of stage 24 and 21. This operation is then used to determine the state of stage 22. Finally, the output of 24 is fed back to the input of stage 21. Of importance, Table 2, which denotes the operation of the LFSR 200, confirms that the output sequences generated by the TYPE I LFSR 100 and the TYPE II LFSR 200 are identical, but for the phase discontinuity caused by a timing shift. This output sequence appears as the pattern of bits in the 4th stages of LFSR 100 and 200. This same pattern of bits is repeated in each other stage, once again shifted in time.

TYPE II LFSR's are generally based upon software models, and are therefore extremely economical, and efficient to implement in modern computers and digital processors This becomes increasingly true as the number of stages and feedback taps increase. For instance, FIG. 1 and FIG. 2 both depict simplistic examples of LFSR's employing only four stages and a single tap. In practice, however, a moderate PN code sequence generator will employ in excess of 30 stages with anywhere from 1 to 30 feedback taps In the preferred embodiment, LFSR 200 comprises a 64 stage shift register, providing a 64th degree polynomial. Approximately 32 taps are used to create the desired PN code sequence. This 64 bit maximal length LFSR will produce a sequence having approximately $1.84 \times 10^{19}$ bits. At 12 KHz, it will take nearly $48.7 \times 10^6$ years for this sequence to repeat.

As PN code sequence generators continue to increase in sophistication, the modern trend is to employ the software implemented TYPE II LFSR where feasible. Unfortunately, the easier to implement TYPE II LFSR does not facilitate an easy or direct determination of the internal state of a TYPE I LFSR. While it is possible to compute the state of a TYPE I, the complexity of this operation and the impact upon system processing power mitigates the benefit derived from utilizing a TYPE II LFSR. Consequently, the inability of a TYPE II LFSR to directly determine the internal state of a corresponding TYPE I LFSR represents a major drawback in the design of a PN code sequence generator utilizing TYPE II LFSRs. This is particularly true in systems designed around a TYPE I implementation.

In order to remove this barrier, it would be extremely advantageous to provide a method of simulating the state of a TYPE I LFSR from information available as a result of a TYPE II LFSR implementation.

SUMMARY OF THE INVENTION

Accordingly, a general object of the present invention is to provide a PN code sequence generator.

It is another object of the present invention to provide a PN code sequence generator utilizing TYPE II LFSRs.

It is the ultimate object of the present invention, however, to simulate the state of a TYPE I LFSR with information available as a result of a TYPE II LFSR implementation.

These and other objects are achieved by the present invention which is briefly described as a method of simulating the state of an LFSR. This invention is based on an observation that after N clock cycles of a TYPE I LFSR, the sequence of obtained outputs is an exact representation of the LFSR's contents N clock cycles previously, where N is the length of the LFSR (number of stages). Furthermore, an appropriately initialized TYPE II implementation of a corresponding TYPE I LFSR, yields exactly the same output sequence. Therefore, it is possible to determine the internal state of each stage of a TYPE I LFSR from the information available as a result of a TYPE II implementation by advancing the clock of the TYPE II LFSR implementation, and simply capturing the output sequence which corresponds to the state of a corresponding TYPE I LFSR.

Accordingly, the present invention suggests simulating the state of a TYPE I LFSR by clocking a TYPE II LFSR to produce an output sequence. This sequence, or at least a portion thereof, is then stored in a storage medium, such as, for example, a shift register. Cascading a TYPE II LFSR output sequence into a shift register of length N, where N is the number of stages employed by the TYPE II LFSR's, is the exact equivalent of a TYPE I LFSR. Assuming the TYPE I and the TYPE II LFSR are properly initialized, and the cascaded system has cycled some minimum number of times, the shift register output will contain data corresponding to the state of the TYPE I LFSR.

In another embodiment, the present invention suggests simulating the state of a TYPE I LFSR by clocking a TYPE II LFSR to synchronize operation with a TYPE I LFSR, and to produce an output sequence. Once again, at least a portion of the output sequence is stored in a shift register, or in an equivalent storage medium. After synchronization, the TYPE II LFSR and shift register timing is adjusted in order to produce the state information of a TYPE I LFSR in the shift register. After the timing adjustment has been made, the shift register's state corresponds to at least a partial state of the TYPE I LFSR.

DETAILED DESCRIPTION OF THE PREFERRED EMBODIMENT

Figure 1:
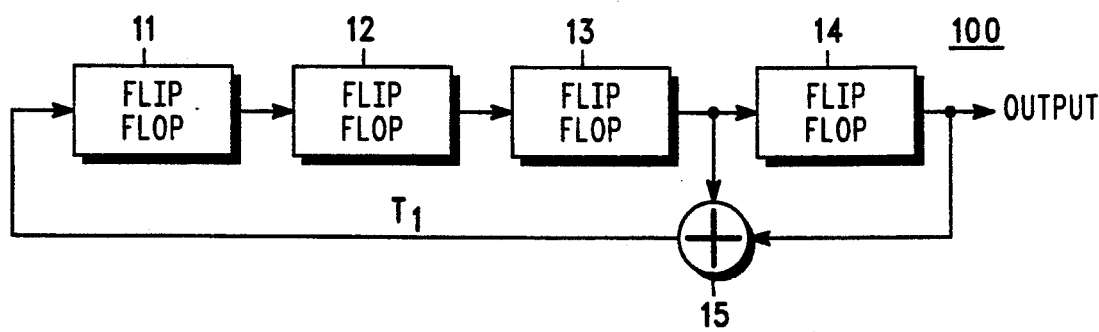
FIG. 1 depicts a simplistic representation of a LFSR.
Figure 2:
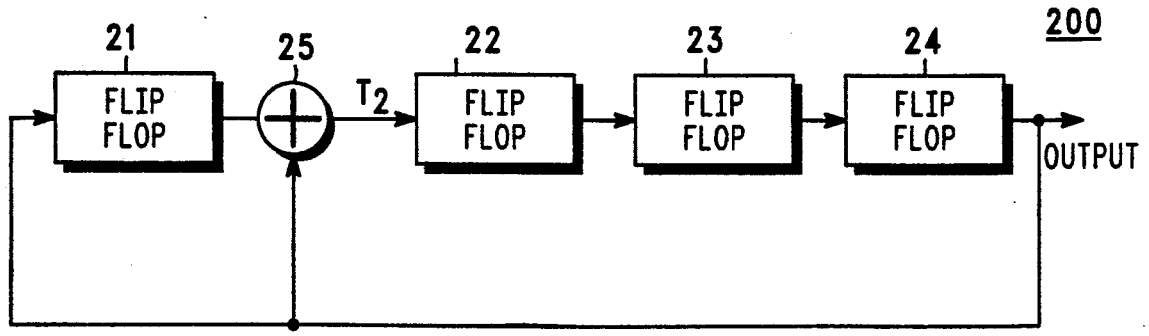
FIG. 2 depicts the LFSR of FIG. 1 in an alternative configuration.
Figure 3:
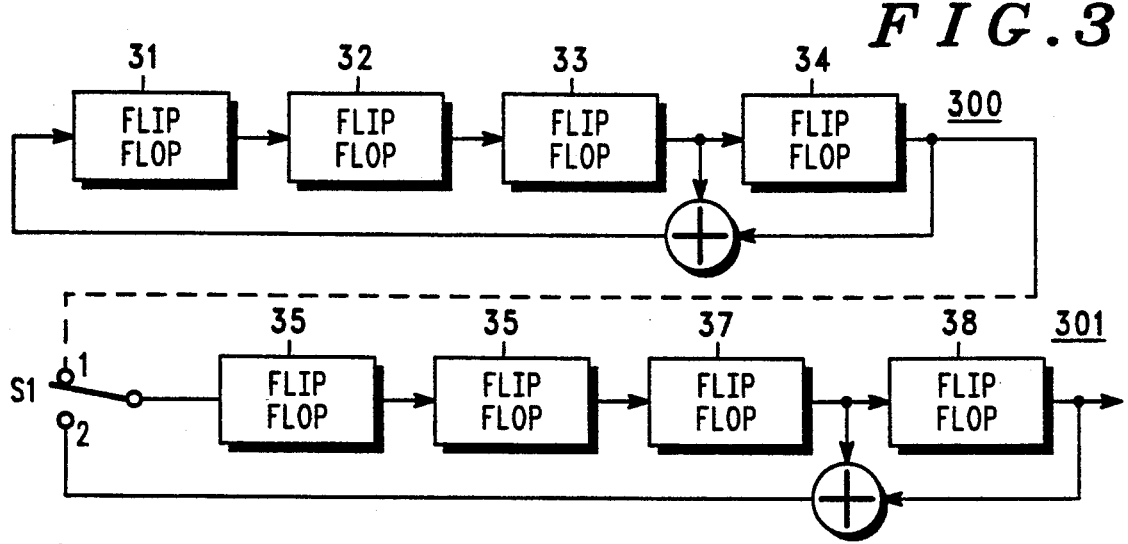
FIG. 3 depicts a PN code sequence generator and receiver utilizing a TYPE I LFSR implementation.

A principal application of the present invention is for a PN code sequence generator and/or receiver like those employed in the field of cryptography. FIG. 3 depicts a PN code sequence generator and receiver. This figure is illustrative of a cryptographic channel which employs a TYPE I LFSR implementation to generate a PN key sequence. In operation, the receive LFSR 301 must first synchronize operation with that of the transmit LFSR 300. Accordingly, the switch S1 in the receiver is initially switched to the 1 position. This enables the receive LFSR 301 to receive the key sequence generated by the transmit LFSR 300. After at least N clock cycles, where N is the number of LFSR stages employed, the switch S1 is switched to the 2 position, in order to allow the receive LFSR 301 to operate in a closed loop fashion. The receiver can then generate the remainder of the PN key sequence autonomously. Referring to Table 3, it will be appreciated that the receiver is not fully synchronized until the Nth clock cycle. According to the example in FIG. 3, synchronization occurs on the 4th clock cycle, at which point the receive LFSR 301 state and output sequence lags the transmit LFSR state by 4 clock cycles.

Figure 4:
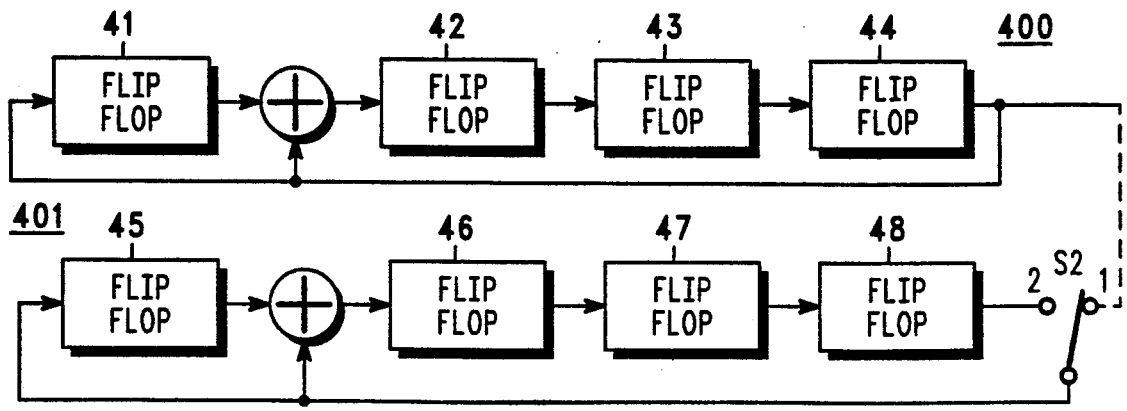
FIG. 4 depicts the PN code sequence generator and receiver of FIG. 3 utilizing a TYPE II LFSR implementation.

Referring now to FIG. 4, FIG. 4 depicts the PN code sequence generator of FIG. 3 implemented utilizing TYPE II LFSRs. Much like the previous example, switch S2 is first switched to position 1 in order to allow the receiver to synchronize operation. After N clock cycles, switch S2 is then switched to position 2 in order to allow the receive LFSR 401 to generate the remainder of the PN key sequence and to operate in a closed loop fashion, autonomous from the operation of the transmit LFSR 400.

An example of the operation of the TYPE II LFSRs 400 and 401 is given in Table 4. Like the TYPE I LFSR previously discussed, the receive LFSR 401 will obtain synchronization in N clock cycles, where N is the length of the LFSR used. Unlike its TYPE I counterpart, however, the TYPE II receiver LFSR 401 will not lag behind the transmit LFSR 400 by N clock cycles. Upon initial synchronization, the receive LFSR 401 will be exactly synchronized in phase with the transmit LFSR 400 (see Table 4).

As previously discussed a TYPE II implementation is generally favored over a TYPE I primarily because the the TYPE II configuration is easily modeled in software and is capable of producing the desired PN output sequence with negligible impact upon system processing power. Unfortunately, the TYPE II implementation suffers from the inability to readily disclose information pertaining to the internal state of a TYPE I LFSR. In order to overcome this shortcoming the present invention discloses a method of simulating the state of a TYPE I LFSR from the PN sequence generated by a TYPE II LFSR.

According to the present invention, this is accomplished by capturing a TYPE II LFSR PN output sequence in a working (shift) register running with an advanced output phase. As previously discussed, the TYPE II implementation of a TYPE I LFSR yields exactly the same PN output sequence. It is possible therefore to determine the state of a TYPE I LFSR from the output of a corresponding TYPE II LFSR by advancing the clock of the TYPE II LFSR, and simply capturing the new PN output sequence which corresponds to the state of a simulated TYPE I LFSR.

Figure 5:
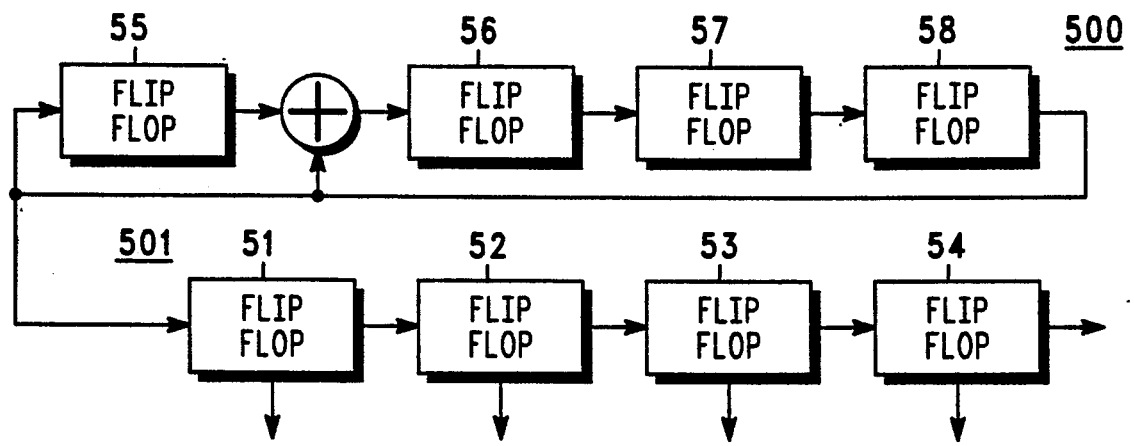
FIG. 5 depicts the LFSR configuration according to the present invention.

FIG. 5 depicts the LFSR configuration according to the present invention. As shown, this embodiment discloses the addition of a working register 501 to the TYPE II LFSR 500. In operation, the LFSR 500 is initialized via an initialization routine that establishes the LFSR's initial state. Next, the LFSR 500 is clocked to produce the PN sequence depicted in Table 5. This PN sequence is also clocked into the working register 501, which delays the PN sequence by an appropriate number of clock cycles in order to simulate the state of a TYPE I LFSR. From Table 5 it can be seen that the PN sequence of the working register 501 corresponds in phase to the PN sequence of the TYPE I LFSR 100 (refer to Table 1). Armed with this knowledge, it is now possible to simulate the internal state of a TYPE I LFSR from a TYPE II LFSR implementation without adversely impacting system processing power.

Figure 6:
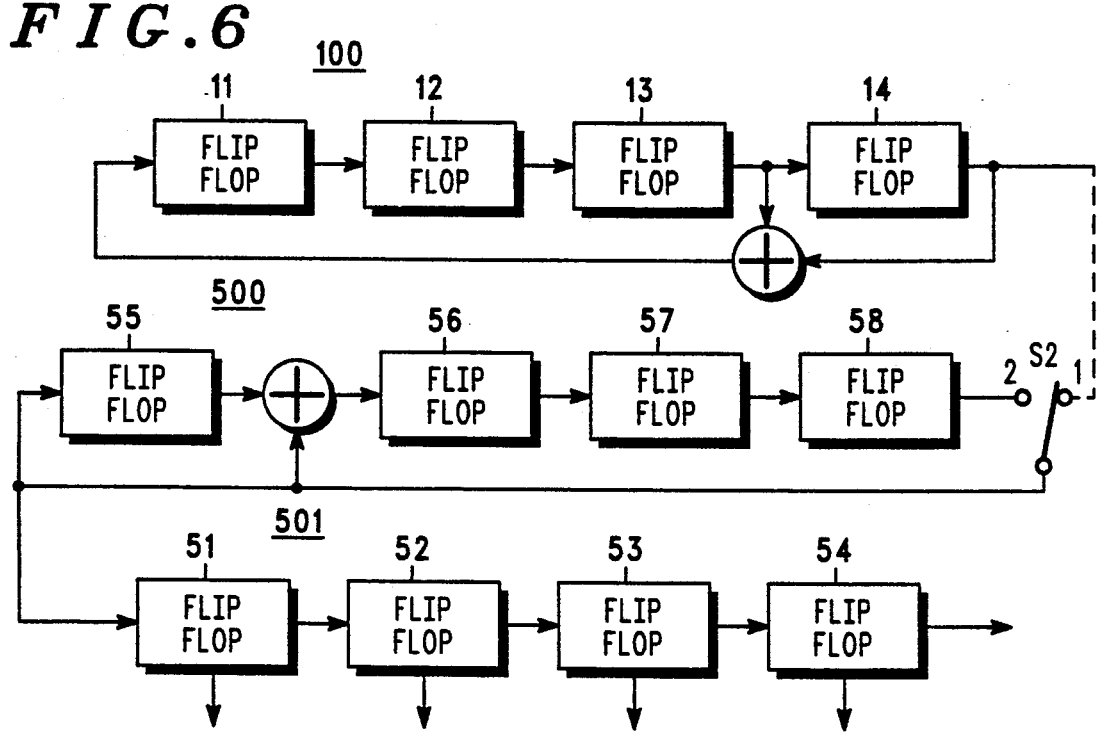
FIG. 6 depicts the LFSR configuration according to the present invention in a partial working environment.

As an example, FIG. 6 depicts the LFSR configuration according to the present invention in a partial working environment. As shown, LFSR configuration 500 is deployed within a cryptographic system as a PN code sequence generator. Since it is understood by those skilled in the art that other components and devices are ordinarily included in this environment, only those pertinent to this invention will be discused.

The initial operation is identical to that discussed under FIG. 4. The switch S2 is first switched to position 1 in order to allow the receiver to synchronize operation. After N clock cycles, switch S2 is switched to position 2 in order to allow the receive LFSR 500 to generate the remainder of the PN key sequence and to operate in a closed loop fashion, autonomous from the operation of the transmit LFSR 100.

Unique to the present invention is again the utilization of working register 501. In operation, after S2 is switched to position 2, and prior to the reception of the next bit by the receiver, the receive LFSR 500 output sequence is clocked into the working register a number of times to produce the desired state information and to appropriately delay the PN output sequence. The result being that the working register 501 content is an exact replication of the performance of a TYPE I LFSR 100. This can be seen by comparing the working register content of Table 5 with the transmit LFSR PN sequence in Table 6.

While the present example establishes the entire state of a TYPE I LFSR, it will be appreciated by those skilled in the art that a partial state of a TYPE I LFSR may also be simulated. This is accomplished by reducing the size of the working register and the number of times the receive LFSR 500 output sequence is clocked into the working register For example, in order to simulate the state of bit 13 of LFSR 100, the receive LFSR 500 output sequence would be clocked into the working register (adjusted) three times prior to the resumption of normal operation.

In summary, the present invention discloses a a method of simulating the state of a TYPE I LFSR from information available as a result of a TYPE II LFSR implementation. While particular embodiments of this invention have been shown and described herein, it will be obvious that additional modifications may be made without departing from the spirit of this disclosure.

What is claimed is:

1. A method for simulating the state of a TYPE I Linear Feedback Shift Register (LFSR) from a TYPE II LFSR comprising the steps of:
    clocking a TYPE II LFSR to produce an output sequence;
    storing at least some of the output sequence in a storage medium; and
    advancing the TYPE II LFSR and storage medium clocks to produce state information,
    whereby the storage medium contains data corresponding to at least a partial state of a TYPE I LFSR.

2. The method of claim 1 further comprising the step of:
    initializing the TYPE II LFSR to correspond with an initial state of the simulated TYPE I LFSR.

3. The method of claim 1 wherein an LFSR is a medium selected from the group of storage media consisting of:
    flip flops;
    latches;
    shift registers;
    working registers;
    memory device addresses; and
    software variables.

4. The method of claim 1 wherein the storage medium is a medium selected from the group of storage media consisting of
    flip flops;
    latches;
    shift registers;
    working registers;
    memory device addresses; and
    software variables.

5. A method for simulating the state of a TYPE I Linear Feedback Shift Register (LFSR) from a TYPE II LFSR comprising the steps of:
    clocking said TYPE II LFSR to produce an output sequence;
    storing at least some of the output sequence in a storage medium; and
    adjusting the TYPE II LFSR and storage medium timing, by advancing the TYPE II LFSR and storage medium clock, to produce state information;
    whereby the storage medium contains data corresponding to at least a partial state of a TYPE I LFSR.

6. The method of claim 5 further comprising the steps of:
    initializing the TYPE II LFSR to correspond with an initial state of the simulated TYPE I LFSR.

7. The method according to claim 5 wherein the step of adjusting the LFSR and storage medium timing occurs after synchronization.

8. The method of claim 5 wherein an LFSR is a medium selected from the group of storage media consisting of:
    flip flops;
    latches;
    shift registers;
    working registers;
    memory device addresses; and
    software variables.

9. The method of claim 5 wherein the storage medium is a medium selected from the group of storage media consisting of:
    flip flops;
    latches;
    shift registers;
    working registers;
    memory device addresses; and
    software variables.

10. A method for simulating the state of a TYPE I Linear Feedback Shift Register (LFSR) comprising the steps of:
    clocking a TYPE I LFSR to produce an output sequence;
    synchronizing the TYPE II LFSR to the TYPE I LFSR;
    clocking the TYPE II LFSR to produce an output sequence;
    storing at least some of the output sequence in a storage medium; and
    adjusting the TYPE II LFSR and storage medium timing, by advancing the TYPE II LFSR and storage medium clocks, to produce state information,
    whereby the storage medium contains data corresponding to at least a partial state of the TYPE I LFSR.

11. The method of claim 10 further comprising the step of:
    initializing the TYPE II LFSR to correspond with an initial state of the TYPE I LFSR.

12. The method according to claim 10 wherein the step of adjusting the TYPE II LFSR and storage medium timing occurs after synchronization.

13. A method of simulating the state of a TYPE I Linear Feedback Shift Register (LFSR) comprising the steps of:

initializing a TYPE II LFSR to correspond with an initial state of a TYPE I LFSR;

clocking the TYPE II LFSR to synchronize operation with the TYPE I LFSR, and to produce an output sequence;

storing at least some of the output sequence in a storage medium; and adjusting the TYPE II LFSR and storage medium timing to produce state information, whereby the storage medium contains data corresponding to at least a partial state of the TYPE I LFSR.

14. A circuit for simulating the state of a TYPE I Linear Feedback Shift Register (LFSR) from a TYPE II LFSR output comprising:

a TYPE II LFSR means, responsive to a received signal, for producing an output sequence;

storage means, coupled to the TYPE II LFSR means, for storing at least some of the output sequence;

clocking means, connected to the TYPE II LFSR means and the storage means, for clocking the TYPE II LFSR means and the storage means to store at least some of the output sequence; and means, coupled to the clocking means, for advancing the TYPE II LFSR and storage medium clock to provide state information, whereby the storage means contains data corresponding to at least a partial state of a TYPE I LFSR.

* * * * *